(12) United States Patent
Buchwitz et al.

(10) Patent No.: US 12,251,981 B2
(45) Date of Patent: Mar. 18, 2025

(54) COMPONENT FOR A VEHICLE SUSPENSION SYSTEM

(71) Applicant: Ford Global Technologies, LLC, Dearborn, MI (US)

(72) Inventors: Joe L. Buchwitz, Huntington Woods, MI (US); John Joseph Uicker, Dearborn, MI (US); Sean Christopher Remisoski, Wyandotte, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/104,934

(22) Filed: Feb. 2, 2023

(65) Prior Publication Data

US 2024/0262146 A1 Aug. 8, 2024

(51) Int. Cl.
*B60G 7/00* (2006.01)

(52) U.S. Cl.
CPC ........ *B60G 7/001* (2013.01); *B60G 2204/416* (2013.01); *B60G 2204/43* (2013.01); *B60G 2206/124* (2013.01); *B60G 2206/81022* (2013.01)

(58) Field of Classification Search
CPC .............. B60G 2204/416; B60G 7/001; B60G 2206/81022
See application file for complete search history.

(56) References Cited

U.S. PATENT DOCUMENTS

| 4,693,628 | A | * | 9/1987 | Renk | B62D 7/18 403/135 |
|---|---|---|---|---|---|
| 9,676,240 | B2 | | 6/2017 | Hinz | |
| 10,351,170 | B2 | | 7/2019 | Gordon | |
| 11,214,109 | B2 | * | 1/2022 | Matsushita | B60G 7/001 |
| 11,292,326 | B2 | | 4/2022 | McCarron et al. | |
| 2009/0295113 | A1 | * | 12/2009 | Inoue | B60G 7/001 280/124.134 |
| 2020/0101807 | A1 | * | 4/2020 | Matsushita | B60G 7/005 |
| 2022/0048348 | A1 | * | 2/2022 | Meyer | B60G 7/001 |
| 2022/0055434 | A1 | | 2/2022 | Hansen et al. | |

FOREIGN PATENT DOCUMENTS

| DE | 19847356 A1 | * | 4/1999 | ............... B60G 3/20 |
|---|---|---|---|---|
| KR | 101077632 B1 | | 10/2011 | |

OTHER PUBLICATIONS

Espace translation of DE 19847356 A1 (Year: 1999).*

* cited by examiner

*Primary Examiner* — Jason D Shanske
*Assistant Examiner* — Scott Lawrence Strickler
(74) *Attorney, Agent, or Firm* — Lorne Forsythe; Price Heneveld LLP

(57) ABSTRACT

A component for a vehicle suspension system that includes a circular first housing that defines a first aperture. A first intermediate portion is coupled to a first end portion of the first housing and has a length that is less than a diameter of the first aperture. A circular second housing is coupled to the first intermediate portion and defines a second aperture. A second intermediate portion is coupled to a second end portion of the first housing. A bracket is coupled to the second intermediate portion, the bracket has a first surface, a second surface, and a plurality of apertures defined on the first surface. The plurality of apertures extend from the first surface to the second surface.

20 Claims, 4 Drawing Sheets

COMPONENT FOR A VEHICLE SUSPENSION SYSTEM

FIELD OF THE DISCLOSURE

The present disclosure generally relates to a vehicle suspension component, in particular, a component for a lower suspension arm.

BACKGROUND OF THE DISCLOSURE

Consumers often compare available features and functionality between vehicles when making a purchasing decision. Accordingly, additional solutions are needed that provide features and functionality that are desirable to consumers.

SUMMARY OF THE DISCLOSURE

According to a first aspect of the present disclosure, a component for a vehicle suspension system includes a circular first housing that defines a first aperture. A first intermediate portion is coupled to a first end portion of the first housing and has a length that is less than a diameter of the first aperture. A circular second housing is coupled to the first intermediate portion and defines a second aperture. A second intermediate portion is coupled to a second end portion of the first housing. A bracket is coupled to the second intermediate portion, the bracket has a first surface, a second surface, and a plurality of apertures defined on the first surface. The plurality of apertures extend from the first surface to the second surface.

Embodiments of the first aspect of the present disclosure can include any one or a combination of the following features:
- the first intermediate portion is integrally coupled to the first housing and the second housing;
- the second intermediate portion is integrally coupled to the first housing and the bracket;
- the first housing comprises a first centerline and the second housing comprises a second centerline that is substantially perpendicular to the first centerline;
- the length of the first intermediate portion is less than a length of the second intermediate portion;
- a thickness of the bracket is less than a thickness of the second housing;
- the second housing further comprises a top surface and a bottom surface opposing the top surface, and the first intermediate portion includes a top section and a bottom section opposing the top section, and the top surface is substantially parallel with the top section and the bottom surface is substantially parallel with the bottom section;
- the top surface of the second housing is recessed from the top section;
- the first housing includes a first center point, and the first sidewall and the second sidewall are concave towards the first center point;
- the bracket defines a triangular shape and the plurality of apertures are defined at outer corners of the bracket; and
- a stamped lower control arm is fastened to the bracket.

According to a second aspect of the present disclosure, a forged component for a vehicle suspension system includes a first housing that has a first sidewall, a second sidewall the first sidewall, and an outer surface surrounding an outer periphery of the first sidewall and the second sidewall. The first sidewall and the second sidewall both define a circular shape. A first aperture is defined at a first housing center portion. A second housing is integrally coupled to the first housing, the second housing has a top surface, a bottom surface opposing the top surface, and an outer segment surrounding an outer periphery of the top surface and the bottom surface. The top surface and the bottom surface both define a circular shape. A second aperture is defined on the top surface. The second aperture extends from the top surface to the bottom surface. A bracket is coupled to the second intermediate portion. The bracket has a first surface, a second surface, and a plurality of apertures defined on the first surface. The plurality of apertures extend from the first surface to the second surface.

Embodiments of the second aspect of the present disclosure can include any one or a combination of the following features:
- the first housing is unitarily formed with the second housing and the bracket and a thickness of the bracket is less than a thickness of the second housing;
- the first housing comprises a first centerline and the second housing comprises a second centerline that is substantially perpendicular to the first centerline;
- a stamped lower control arm and a plurality of fasteners disposed within the plurality of apertures and the plurality of fasteners couple the stamped lower control arm to the bracket;
- the second housing further comprises a top surface and a bottom surface opposing the top surface, and the top surface is substantially parallel with the first surface of the bracket and the bottom surface is substantially parallel with the second surface of the bracket;
- the first housing includes a first center point, and the first sidewall and the second sidewall are concave towards the first center point; and
- the bracket defines a triangular shape, and the plurality of apertures are defined at outer corners of the bracket.

According to a third aspect of the present disclosure, a component for a vehicle suspension system includes a first housing that has a circular shape and defines a first aperture and a first centerline. A first intermediate portion is integrally coupled to an end of the first housing. The first intermediate portion has a length that is less than a diameter of the first aperture. A second housing is integrally coupled to the first intermediate portion. The second housing has a circular shape and defines a second aperture and a second centerline. The second centerline is substantially perpendicular to the first centerline. A second intermediate portion is integrally coupled to an opposing end of the first housing. A bracket is integrally coupled to the second intermediate portion. The bracket has a first surface, a second surface, and a plurality of apertures defined on the first surface. The plurality of apertures extend from the first surface to the second surface. The bracket defines a triangular shape. The plurality of apertures are defined at outer corners of the bracket. The bracket has a thickness less than a thickness of the second housing.

Embodiments of the third aspect of the present disclosure can include any one or a combination of the following features:
- the length of the first intermediate portion is less than a length of the second intermediate portion; and
- the first intermediate portion includes a top section and a bottom section opposing the top section, and the top surface of the second housing is recessed from the top section.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
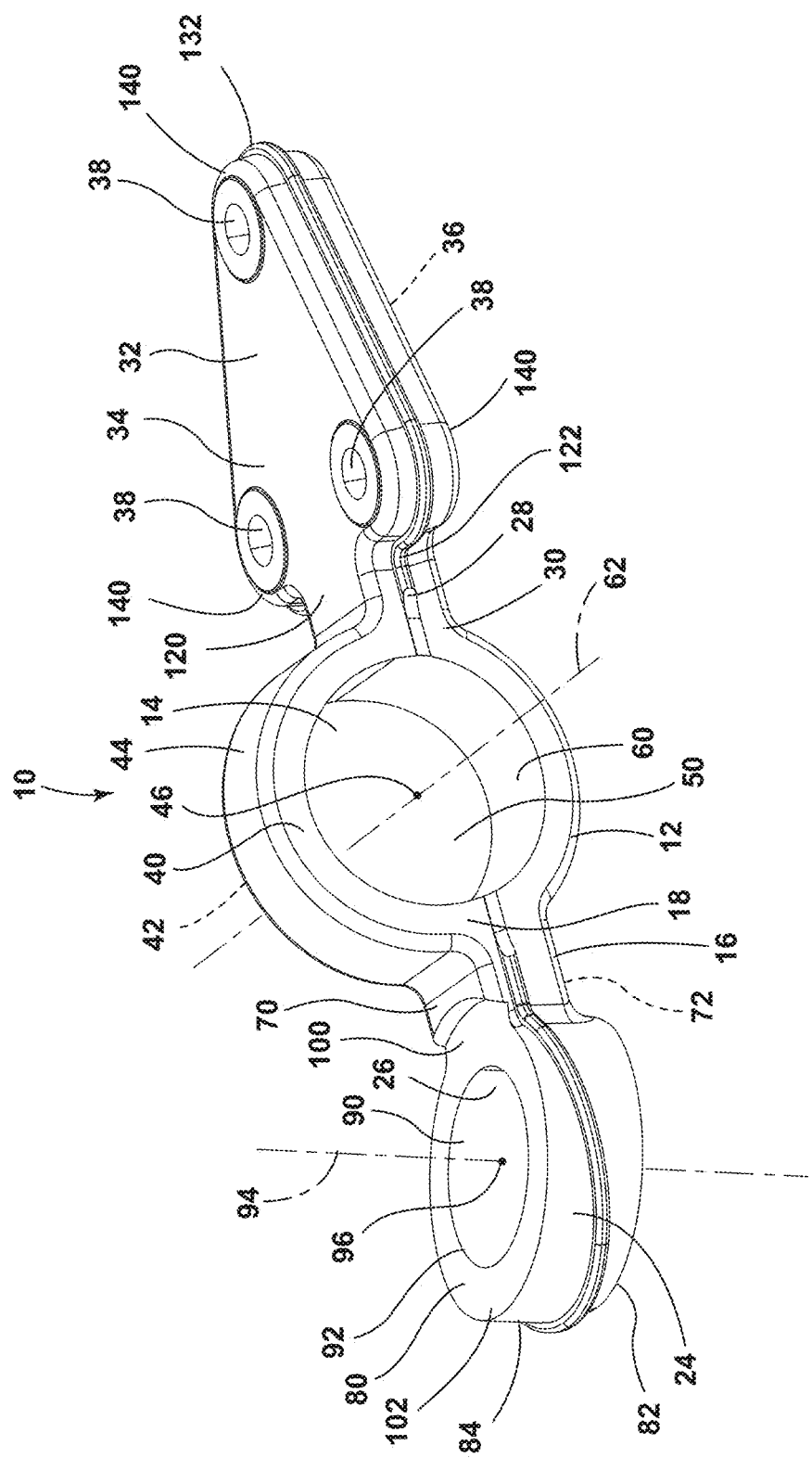
FIG. 1 is top perspective view of a suspension arm component, according to one example.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a suspension arm component. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-4, depicted is a suspension arm component 10. The suspension arm component 10 includes a first housing 12. The first housing 12 has a circular shape and defines a first aperture 14. A first intermediate portion 16 is coupled to a first end portion 18 of the first housing 12 and has a length 20 that is less than a diameter 22 of the first aperture 14. A second housing 24 is coupled to the first intermediate portion 16 and defines a second aperture 26. A second intermediate portion 28 is coupled to a second end portion 30 of the first housing 12 and has a length that is less than the diameter 22 of the first aperture 14. A bracket 32 is coupled to the second intermediate portion 28, the bracket 32 has a first surface 34 a second surface 36, and a plurality of apertures 38 defined on the first surface 34. The plurality of apertures 38 extend from the first surface 34 to the second surface 36.

Figure 2:
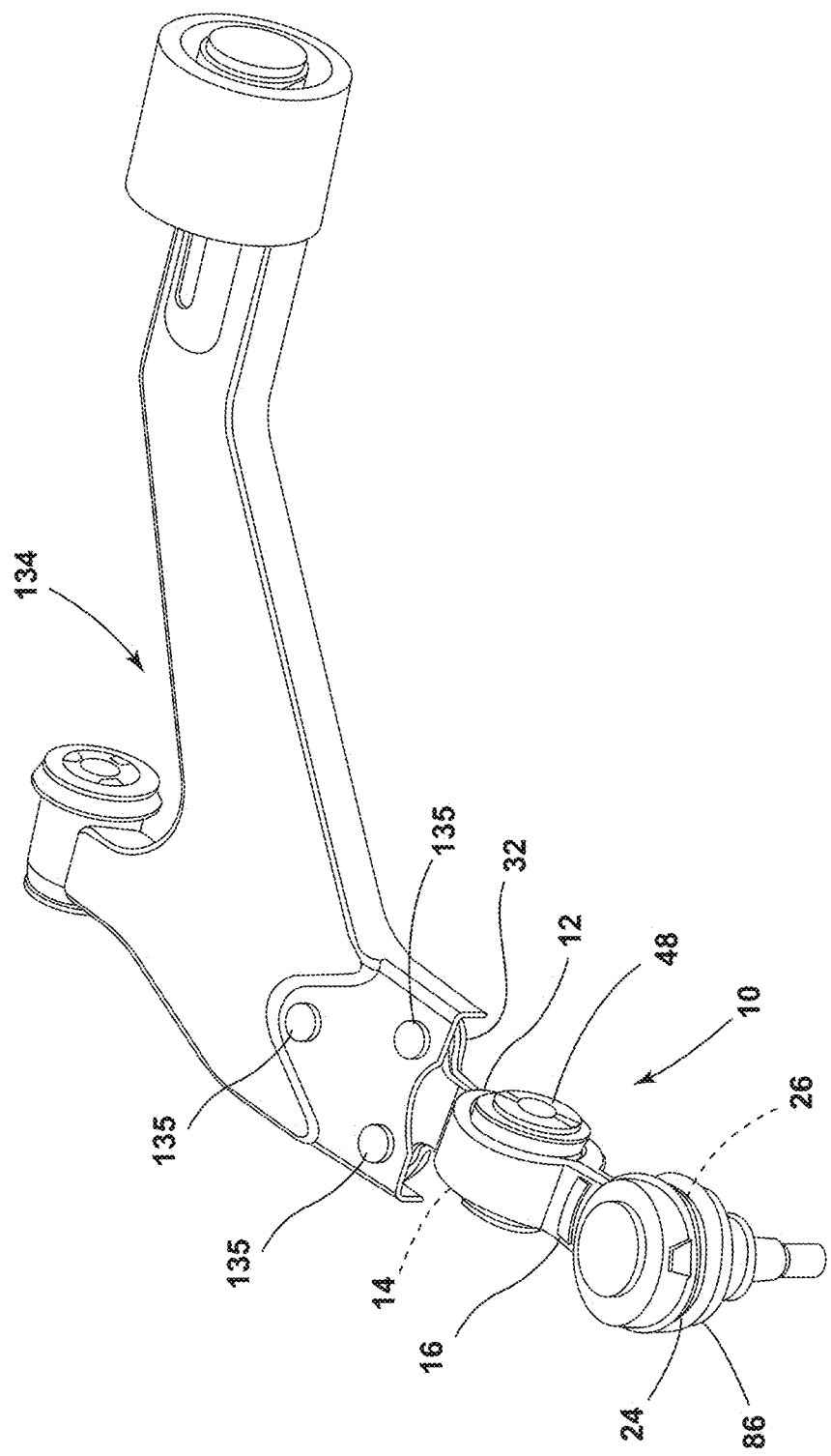
FIG. 2 is a top perspective view of a suspension arm component coupled to a lower control arm assembly, according to one example.
Figure 3:
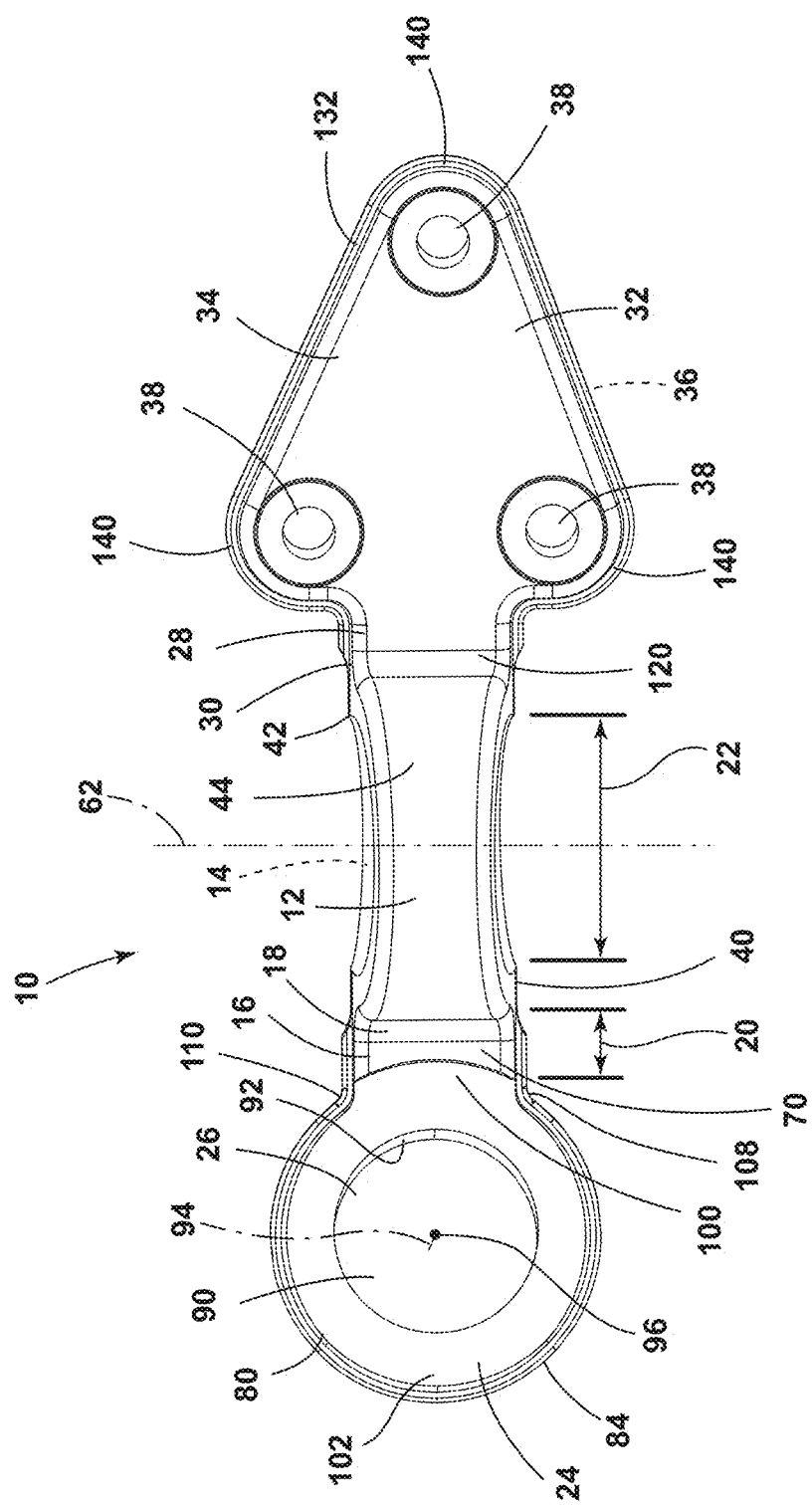
FIG. 3 is top view of a suspension arm component, according to one example.

Referring again to FIGS. 1-4, the suspension arm component 10 includes the first housing 12. The first housing 12 includes a first sidewall 40, a second sidewall 42 opposing the first sidewall 40, and an outer surface 44 that wraps around an outer periphery of the first sidewall 40 and the second sidewall 42. As illustrated in FIG. 3, the first sidewall 40 and the second sidewall 42 may be both concave to a first center point 46 of the first housing 12, such that a width of the first housing 12 proximate the first center point 46 is less than a width of the first housing 12 proximate the first intermediate portion 16 or the second intermediate portion 28. In some embodiments, the first housing 12 may generally define a circular shape. The first housing 12 is configured to receive and retain a damper bushing 48. Additionally, or alternatively, it is contemplated that the first housing 12 may have any practicable size, depending on the size and characteristics of the damper bushing 48, as provided herein.

Figure 4:
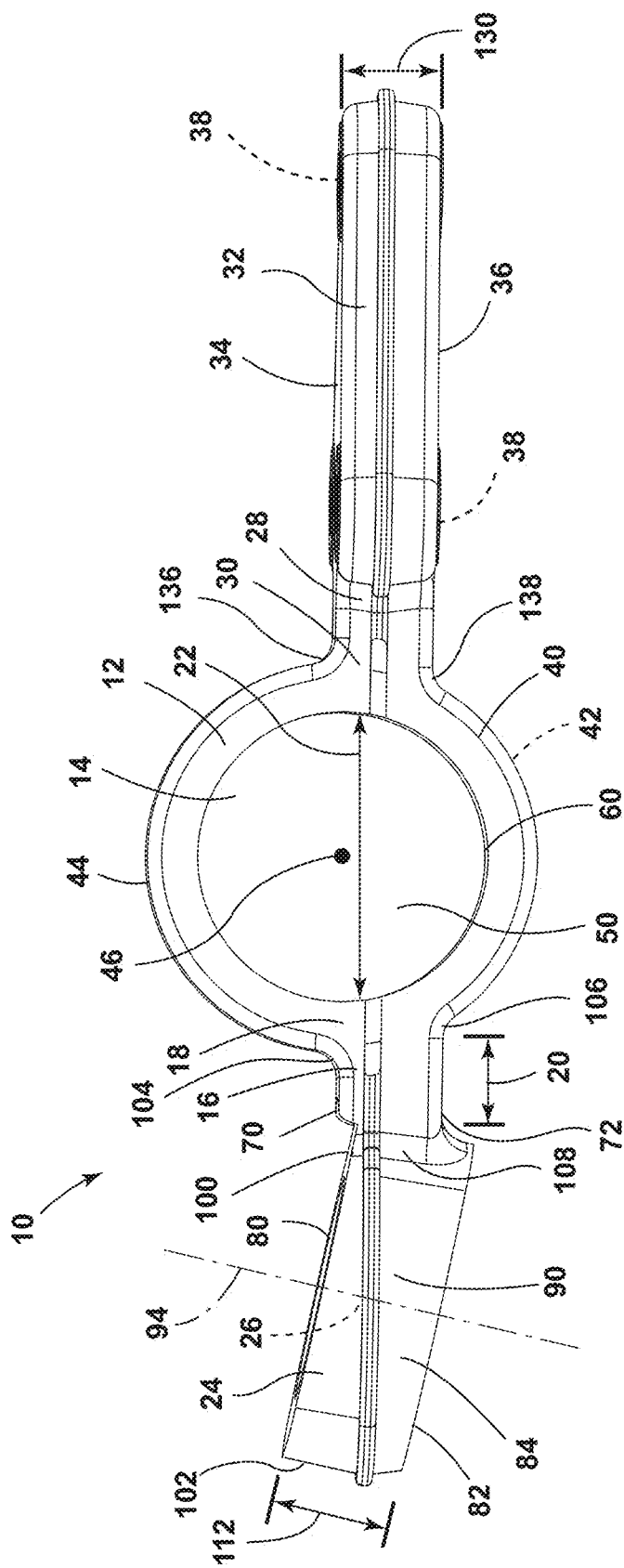
FIG. 4 is a side view of a suspension arm component, according to one example.

Referring to FIGS. 1 and 4, the first housing 12 may define the first aperture 14 within a center portion 50 of the first housing 12. In some embodiments, the first aperture 14 may have a generally circular shape. According to various embodiments, the first aperture 14 may be configured to receive the damper bushing 48. It is generally contemplated that the first aperture 14 may vary in shape, placement, and/or size, depending on the physical characteristics of the damper bushing 48 inserted into the first aperture 14.

Referring again to FIGS. 1 and 4, the first housing 12 may include an inner surface 60 opposing the outer surface 44. The inner surface 60 may encompass a portion or an entirety of an outer periphery of the first aperture 14. The inner surface 60 operably contacts the damper bushing 48, such as a sleeve of the damper busing 48. In some embodiments, the inner surface 60 may include a texture that either increases or decreases friction between the damper bushing 48 and the inner surface 60. For example, the inner surface 60 may include a smooth, machined texture that aids in the insertion of the damper bushing 48 into the first aperture 14.

The first housing 12 may also define a first centerline 62 at the first center point 46 of the center portion 50. As illustrated in FIG. 1, the first centerline 62 may extend through the first aperture 14 and be generally parallel with the inner surface 60. In various embodiments, the first intermediate portion 16 and second intermediate portion 28 extend away from the first housing 12 in a direction perpendicular to the first centerline 62 of the first aperture 14.

Referring to FIGS. 1-4, the suspension arm component 10 includes the first intermediate portion 16 coupled to the first housing 12. In some embodiments, the first intermediate portion 16 extends between the first housing 12 and the second housing 24. As illustrated in FIGS. 1 and 3-4, the first intermediate portion 16 may be integrally coupled to the first housing 12 and the second housing 24. The first intermediate portion 16 may include a top section 70 and a bottom section 72 opposing the top section 70. The top section 70 and the bottom section 72 may be integrally coupled to the first housing 12 and the second housing 24. For example, the top section 70 may be integrally coupled to the outer surface 44 of the first housing 12 and a top surface 80 of the second housing 24, and the bottom section 72 may be integrally coupled to the outer surface 44 of the first housing 12 and a bottom surface 82 of the second housing 24. According to various aspects, the first intermediate portion 16 couples the first housing 12 to the second housing 24 and provides a retaining force that assists in maintaining a determined distal relationship between the first housing 12 and the second housing 24, as provided herein.

Referring to FIGS. 1-4, the suspension arm component 10 includes the second housing 24 coupled to the first intermediate portion 16. In some embodiments, the second housing 24 may be integrally coupled to the first intermediate portion 16. The second housing 24 includes a top surface 80, a bottom surface 82 opposing the top surface 80, and an outer segment 84 extending around an outer periphery of the second housing 24. In some embodiments, the top surface 80, bottom surface 82, and outer segment 84 may generally define a circular shape. As illustrated in FIG. 3, the top surface 80, in some embodiments, may be generally parallel to the first intermediate portion top section 70 and/or may be recessed from the first intermediate portion top section 70. The recessed relationship between the top surface 80 and the first intermediate portion top section 70 may then be utilized to assist insertion of a ball joint 86. According to various embodiments, the top surface 80 and the bottom surface 82 may be positioned generally perpendicular to the first sidewall 40 and the second sidewall 42 of the first housing 12 such that the top surface 80 and bottom surface 82 are generally parallel with the top section 70 and the bottom section 72 of the first intermediate portion 16. In yet other embodiments, the second housing 24 may be positioned such that the top surface 80 and the bottom surface 82 are angled relative to the top section 70 and the bottom section 72 of the first intermediate portion 16. For example, the second housing 24 may be angled such that an outer end 102 of the second housing 24 is upward of an inner end 100 of the second housing 24, as illustrated in FIG. 4. According to various embodiments, the second housing 24 is configured to retain the ball joint 86. It is generally contemplated that the second housing 24 may have any practicable size and/or placement, so long as the second housing 24 may retain the ball joint 86.

Further, as illustrated in FIGS. 1 and 3, the second housing 24 can include the second aperture 26 defined on a center segment 90 of the second housing 24. The second aperture 26 may generally define a semi-circular shape and may be configured to receive and retain the ball joint 86. Additionally, or alternatively, the first aperture 14 may vary in shape, placement, and/or size, depending on the physical characteristics of the ball joint 86.

The second housing 24 can also include an inner surface 92 opposing the outer surface 84. The inner surface 92 may encompass a portion or an entirety of an outer periphery of the second aperture 26. According to various embodiments, the inner surface 92 operably contacts and engages with the ball joint 86, namely a socket housing of the ball joint 86. In some embodiments, the inner surface 92 may include a texture that either increases or decreases friction between the ball joint 86 and the inner surface 92. For example, the inner surface 92 can include a smooth, machined texture that aids in the insertion of the ball joint 86 into the second aperture 26.

The second housing 24 may also define a second centerline 94 at a second center point 96. As illustrated in FIG. 1, the second centerline 94 may extend through the second aperture 26 and be generally parallel with the inner surface 92 of the second housing 24. According to various embodiments, the second center point 96 may be coplanar with the first center point 46, and/or the second centerline 94 may be substantially perpendicular to the first centerline 62 along multiple axes. In yet other embodiments, the second housing 24 may be angled relative to the first intermediate portion 16 such that the second centerline 94 is likewise angled toward the first centerline 62 along an axis and generally perpendicular to the first centerline 62 along another axis.

Referring to FIGS. 1-4, the second housing 24 is positioned relative to the first housing 12 such that the second housing 24 is in close proximity to the first housing 12. In some embodiments, the distance between the first housing 12 and the second housing 24 can be at least partially determined by a length 20 of the first intermediate portion 16. For example, the first intermediate portion length 20 may be defined as being less than the diameter 22 of the first aperture 14. In yet other embodiments, the first housing 12 and the second housing 24 may be directly coupled to one another. In this embodiment, the inner end 100 of the second housing 24 may be proximate and abutting a first end portion 18 of the first housing 12 such that the outer surface 44 of the first housing 12 is proximate the top surface 80 and the bottom surface 82 of the second housing 24. In yet other embodiments, the first housing 12 may be integrally coupled to the second housing 24. The integral coupling between the first housing 12 and the second housing 24 may be such that a first corner 104 is defined at the intersection between the top surface 80 and the outer surface 44, and a second corner 106 is defined at an intersection between the bottom surface 82 and the outer surface 44. Further, in such embodiments, a third corner 108 may be defined at an intersection between the first sidewall 40 and the outer segment 84 of the second housing 24, and a fourth corner 110 may be defined at an intersection of the second sidewall 42 and the outer surface 44 of the second housing 24. The close proximity between the first housing 12 and the second housing 24 is such that the damper bushing 48, and likewise a strut (not shown) connected to the damper bushing 48, can be in close proximity with the second housing 24 and the ball joint 86.

The suspension arm component 10 includes the second intermediate portion 28 opposing the first intermediate portion 16 and extending between the first housing 12 and the bracket 32. As illustrated in FIGS. 3 and 4, the second intermediate portion 28 may be integrally coupled to the first housing 12 and the bracket 32. The second intermediate portion 28 may include a top segment 120 and a bottom segment 122 opposing the top segment 120, wherein the top segment 120 and the bottom segment 122 are integrally coupled to the first housing 12 and the bracket 32. For example, the top segment 120 may be integrally coupled to the outer surface 44 of the first housing 12 and the first surface 34 of the bracket 32, and the bottom segment 122 may be integrally coupled to the outer surface 44 of the first housing 12 and a second surface 36 of the bracket 32. According to various aspects, the second intermediate portion 28 couples the first housing 12 to the bracket 32 and provides a retaining force that assists in maintaining a determined distal relationship between the first housing 12 and the bracket 32, as provided herein.

Referring further to FIGS. 1-4, the suspension arm component 10 includes a bracket 32. The bracket 32 may be coupled to the second intermediate portion 28. In some configurations, the bracket 32 includes a first surface 34, a second surface 36 opposing the first surface 34, and an outer section 132 extending around an outer periphery of the first surface 34 and the second surface 36. According to various embodiments, the first surface 34 may be substantially parallel with the top surface 80 of the second housing 24 and the second surface 36 may be substantially parallel with the bottom surface 82 of the second housing 24. In yet other embodiments, the bracket 32 may be angled relative to the first housing 12 and/or the second housing 24. For example, the first surface 34 may be angled relative to the top surface 80 and/or the bottom surface 82 of the second housing 24 and the second surface 36 may be angled relative to the top surface 80 and/or the bottom surface 82. As illustrated in FIGS. 1 and 3, the bracket 32 may generally define a triangular shape and may also have a thickness 130 that is less than a thickness 112 of the second housing 24. The bracket 32 is configured to couple to a suspension assembly, such as a lower control arm assembly 134. Additionally, or alternatively, the bracket 32 may be comprised of various shapes and be of various sizes, so long as the bracket 32 can be coupled to the lower control arm assembly 134.

Referring further to FIGS. 1 and 3, the bracket 32 may define a plurality of apertures 38. The plurality of apertures 38 may be defined on the first surface 34 and extend from the first surface 34 to the second surface 36. In some embodiments, the plurality of apertures 38 may be comprised of an aperture 38 at each outer corner 140 of the bracket 32. For example, if the bracket 32 is triangular in shape, the plurality of apertures 38 may be comprised of three apertures 38 defined at three outer corners 140, as illustrated in FIGS. 1 and 3. The plurality of apertures 38 can be configured to receive fasteners 135 that couple the bracket 32 to the lower control arm assembly 134. In some non-limiting examples, the fasteners 135 may be comprised of various kinds of fasteners, such as one or more rivets, one or more bolts, one or more welds, and/or a combination thereof. Additionally, or alternatively, it is generally contemplated that the plurality of apertures 38 may be comprised of a various number of apertures in various positions along the bracket 32, so long as the bracket 32 may be coupled to the lower control arm assembly 134.

Referring again to FIG. 2, the suspension arm component 10 can be coupled to various lower control arm assemblies 134. In some examples, the lower control arm assembly 135 may be comprised of a stamped lower control arm assembly 134, as illustrated in FIG. 2. The suspension arm component 10 can then be fastened to the stamped lower control arm assembly 134. In such examples, the stamped lower control arm assembly 134 may have a thickness less than a thickness of other lower control arms, such as a forged lower control arm or a cast and machined lower control arm. Additionally, in such examples, the stamped lower control arm 134 may have a thickness that is less than a height of a portion of the suspension arm component 10, such a height of the first housing 12. In other examples, the lower control arm assembly 134 may be one or various kinds of lower control arm assemblies 134, such as a forged lower control arm or a cast and machined lower control arm.

Referring again to FIGS. 1-4, the bracket 32 is positioned relative to the first housing 12 in a manner that permits coupling of the suspension arm component 10 to the lower control arm assembly 134. The distance between the first housing 12 and the bracket 32 can be at least partially determined by a length of the second intermediate portion 28. In some embodiments, the second intermediate portion 28 length permits coupling of the bracket 32 to a lower control arm assembly 134, while also permitting the proximate relationship between the first housing 12 and the second housing 24, as provided herein. In yet other embodiments, the first housing 12 and the bracket 32 can be directly coupled to one another. In this embodiment, the bracket 32 may be proximate and abutting a second end portion 30 of the first housing 12. In yet other embodiments, the first housing 12 may be integrally coupled to the bracket 32. In such embodiments, the outer surface 44 of the first housing 12 may intersect with the bracket first surface 34 at a fifth corner 136, and the outer surface 44 may intersect with the bracket second surface 36 at a sixth corner 138. In some examples, the bracket 32 may extend outward from the first housing 12 in such a manner that the first surface 34 and/or the second surface 36 are generally perpendicular with the first centerline 62. In other examples, the bracket 32 may extend outward and be angled relative to the first housing 12 or the second housing 24 such that the first surface 34 and/or the second surface 36 are angled relative to the first centerline 62. Additionally, in yet other embodiments, the first housing 12, the second housing 24, and the bracket 32 may all be unitarily formed within a single component, as illustrated in FIGS. 1 and 3-4. In some examples, the bracket 32 may extend outward from the first housing 12 in such a manner that the first surface 34 and/or the second surface 36 are generally perpendicular with the first centerline 62. In other examples, the bracket 32 may extend outward and be angled relative to the first housing 12 or the second housing 24 such that the first surface 34 and/or the second surface 36 are angled relative to the first centerline 62. Additionally, or alternatively, it is generally contemplated that the distance between the first housing 12 and the bracket 32 may be of various lengths, so long as the bracket 32 may couple to the lower control arm assembly 134.

Use of the presently disclosed component may provide for a variety of advantages. For example, the close proximity of the first housing 12 to the second housing 24 allows for near placement of a strut to the ball joint 86, which in turn aids vehicle suspension and tire alignment, while also reducing torsion acting along a lower control arm 134. Additionally, the coupling of the suspension arm component 10 to a lower control arm 134 allows for increased variance in the suspension arm component 10 size or control arm size, while maintaining the size of the other. For example, the suspension arm component 10 may be coupled to either a first lower control arm 134 of a first size, or a second lower control arm 134 of a second, greater size. In other examples, the suspension arm component 10 may be coupled to a stamped lower control arm 134, as illustrated in FIG. 2. In such examples, the suspension arm component 10 advantageously allows for near placement of a strut to the ball joint while the stamped lower control arm 134 advantageously allows for a reduction in component weight and material use. In embodiments where the first housing 12 is integrally coupled to both the second housing 24 and the bracket 32, additional advantages may be provided. For example, the number of manufacturing processes may be reduced by forging the suspension arm component 10 out of a single material.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A component for a vehicle suspension system, comprising:
    a first housing having a circular shape and defining a first aperture;
    a first intermediate portion coupled to a first end portion of the first housing, the first intermediate portion having a length that is less than a diameter of the first aperture;
    a second housing coupled to the first intermediate portion, the second housing having a circular shape and defining a second aperture extending through the second housing;
    a second intermediate portion coupled to a second end portion of the first housing, the second intermediate portion having a length that is less than the diameter of the first aperture, the second end portion opposing the first end portion; and
    a bracket coupled to the second intermediate portion, the bracket having a first surface, a second surface, and a plurality of apertures defined on the first surface, the plurality of apertures extending from the first surface to the second surface, wherein the first housing and the second housing are connected by the first intermediate portion, and the first housing and the bracket are connected by the second intermediate portion, wherein the first and second intermediate portions extend away from the first housing in a direction perpendicular to a first centerline of the first aperture.

2. The component of claim 1, wherein the length of the first intermediate portion is less than a length of the second intermediate portion.

3. The component of claim 1, wherein a thickness of the bracket is less than a thickness of the second housing.

4. The component of claim 1, wherein the second housing further comprises a top surface and a bottom surface opposing the top surface, and wherein the first intermediate portion includes a top section and a bottom section opposing the top section, and wherein the top surface is substantially parallel with the top section and the bottom surface is substantially parallel with the bottom section.

5. The component of claim 4, wherein the top surface of the second housing is recessed from the top section.

6. The component of claim 1, wherein the first housing includes a first center point, a first sidewall, and a second sidewall opposing the first sidewall, and wherein the first sidewall and the second sidewall are concave towards the first center point.

7. The component of claim 1, wherein the bracket defines a triangular shape, and wherein the plurality of apertures are defined at outer corners of the bracket.

8. The component of claim 1, further comprising a stamped lower control arm, the stamped lower control arm being fastened to the bracket.

9. A forged component for a vehicle suspension system, comprising:
a first housing having a first sidewall, a second sidewall opposing the first sidewall, and an outer surface surrounding an outer periphery of the first sidewall and the second sidewall, wherein the first sidewall and the second sidewall both define a circular shape, and wherein a first aperture is defined at a first housing center portion;
a second housing integrally coupled to the first housing, the second housing having a top surface, a bottom surface opposing the top surface, and an outer segment surrounding an outer periphery of the top surface and the bottom surface, wherein the top surface and the bottom surface both define a circular shape, and wherein a second aperture is defined on the top surface, the second aperture extending from the top surface to the bottom surface; and
a bracket coupled to the first housing, the bracket having a first surface, a second surface, and a plurality of apertures defined on the first surface, the plurality of apertures extending from the first surface to the second surface, wherein the first housing and the second housing are connected by a first intermediate portion, and the first housing and the bracket are connected by a second intermediate portion, wherein the first and second intermediate portions extend away from the first housing in a direction perpendicular to a first centerline of the first aperture.

10. The forged component of claim 9, wherein the first housing is unitarily formed with the second housing and the bracket, and wherein a thickness of the bracket is less than a thickness of the second housing.

11. The forged component of claim 9, wherein the first housing comprises a first centerline and the second housing comprises a second centerline that is substantially perpendicular to the first centerline.

12. The forged component of claim 9, further comprising a stamped lower control arm and a plurality of fasteners disposed within the plurality of apertures, wherein the plurality of fasteners couples the stamped lower control arm to the bracket.

13. The forged component of claim 9, wherein the second housing further comprises a top surface and a bottom surface opposing the top surface, and wherein the top surface is substantially parallel with the first surface of the bracket and the bottom surface is substantially parallel with the second surface of the bracket.

14. The forged component of claim 9, wherein the first housing includes a first center point, and wherein the first sidewall and the second sidewall are concave towards the first center point.

15. The forged component of claim 9, wherein the bracket defines a triangular shape, and wherein the plurality of apertures are defined at outer corners of the bracket.

16. A component for a vehicle suspension system, comprising:
a first housing having a circular shape and defining a first aperture and a first centerline;
a first intermediate portion integrally coupled to an end of the first housing, the first intermediate portion having a length that is less than a diameter of the first aperture;
a second housing integrally coupled to the first intermediate portion, the second housing having a circular shape and defining a second aperture extending through the second housing and a second centerline, wherein the second centerline is substantially perpendicular to the first centerline;
a second intermediate portion integrally coupled to an opposing end of the first housing, the second intermediate portion having a length that is less than the diameter of the first aperture; and
a bracket integrally coupled to the second intermediate portion, the bracket having a first surface, a second surface, and a plurality of apertures defined on the first surface, the plurality of apertures extending from the first surface to the second surface, wherein the bracket defines a triangular shape, and wherein the plurality of apertures are defined at outer corners of the bracket, and wherein the bracket has a thickness less than a thickness of the second housing.

17. The component of claim 16, wherein the length of the first intermediate portion is less than a length of the second intermediate portion.

18. The component of claim 16, wherein the first intermediate portion includes a top section and a bottom section opposing the top section, and wherein the top surface of the second housing is recessed from the top section.

19. The forged component of claim 9, wherein the first and second intermediate portions each have a length that is less than a diameter of the first aperture.

20. The component of claim 16, wherein the first housing and the second housing are connected by the first intermediate portion, and the first housing and the bracket are connected by the second intermediate portion, wherein the first and second intermediate portions extend away from the first housing in a direction perpendicular to the first centerline of the first aperture.

* * * * *